(12) United States Patent
Ochoa (10) Patent No.: US 7,740,306 B2
(45) Date of Patent: Jun. 22, 2010

(54) STIFFENERS FOR UTILITY TRAILER STRUCTURAL PANELS

(75) Inventor: Carlos M. Ochoa, Plano, TX (US)

(73) Assignee: Utilicorp L.C., Plano, TX (US)

( * ) Notice: Subject to any disclaimer, the term of this patent is extended or adjusted under 35 U.S.C. 154(b) by 26 days.

(21) Appl. No.: 11/881,289

(22) Filed: Jul. 26, 2007

(65) Prior Publication Data

US 2008/0023988 A1  Jan. 31, 2008

Related U.S. Application Data

(60) Provisional application No. 60/833,382, filed on Jul. 26, 2006.

(51) Int. Cl.
*B60J 5/00* (2006.01)

(52) U.S. Cl. .................... 296/186.1; 296/191

(58) Field of Classification Search ............. 296/186.1, 296/182.1, 191, 29, 210, 104; 52/843, 43
See application file for complete search history.

(56) References Cited

U.S. PATENT DOCUMENTS

| | | | |
|---|---|---|---|
| 851,932 A | 4/1907 | Grossman | |
| 1,093,657 A | 4/1914 | Sisson | |
| 1,681,758 A * | 8/1928 | Wight | 52/467 |
| 2,194,901 A | 3/1940 | Heuer | |
| 2,577,671 A * | 12/1951 | Barrett | 296/204 |
| 2,697,990 A | 12/1954 | Parsons | |
| 3,700,277 A | 10/1972 | Montean, Jr. | |
| 3,976,269 A * | 8/1976 | Gupta | 244/119 |
| 4,047,336 A * | 9/1977 | Stahlhut et al. | 52/28 |
| 4,375,898 A * | 3/1983 | Stephens | 296/180.3 |
| 4,660,882 A * | 4/1987 | Hensiek | 296/104 |
| 4,840,127 A * | 6/1989 | Tomaka | 296/186.1 |
| 5,000,507 A | 3/1991 | Baxter | |
| 5,007,225 A * | 4/1991 | Teasdale | 52/783.17 |
| 5,069,737 A * | 12/1991 | Guiton | 156/210 |
| 5,112,099 A * | 5/1992 | Yurgevich et al. | 296/186.1 |
| 5,242,523 A * | 9/1993 | Willden et al. | 156/285 |
| 5,348,176 A * | 9/1994 | Yurgevich et al. | 220/1.5 |
| 5,397,621 A * | 3/1995 | Donzac et al. | 428/178 |
| 5,423,587 A | 6/1995 | Ingram | |
| 5,429,408 A | 7/1995 | Henning et al. | |
| 5,433,501 A * | 7/1995 | Thomas et al. | 296/186.1 |
| 5,540,016 A | 7/1996 | Clausen | |
| 5,687,538 A * | 11/1997 | Frobosilo et al. | 52/846 |
| 5,958,556 A * | 9/1999 | McCutcheon | 428/172 |
| 5,992,109 A * | 11/1999 | Jonker | 52/238.1 |
| 6,109,684 A * | 8/2000 | Reitnouer | 296/184.1 |
| 6,250,360 B1 * | 6/2001 | Ochoa | 160/201 |
| 6,283,313 B1 * | 9/2001 | Schafer | 211/186 |
| 6,349,521 B1 | 2/2002 | McKeon et al. | |
| 6,428,080 B1 * | 8/2002 | Ochoa | 296/146.6 |

(Continued)

*Primary Examiner*—Kiran B. Patel
(74) *Attorney, Agent, or Firm*—Browning Bushman P.C.

(57) ABSTRACT

A utility trailer structural panel (10) of the skin-stiffener type has a skin (15) supported by uniformly spaced stiffeners or roof bows (39). Stiffeners or roof bows (39) are secured to panel skin (15) and extend outwardly from the associated panel skin (15). Each stiffener (39) has central flange (35) from which extend webs (36, 37) to mounting flanges (41, 42). Mounting flanges (41, 42) have free edges and respective beads or curls (44, 46) formed thereon for stabilizing of flanges (41, 42) to improve load transfer at the interface between the roof bows (39) and the skin (15).

7 Claims, 6 Drawing Sheets

U.S. PATENT DOCUMENTS

| | | | |
|---|---|---|---|
| 6,458,309 B1 * | 10/2002 | Allen et al. | 264/319 |
| 6,484,464 B1 * | 11/2002 | Ochoa | 52/414 |
| 6,588,831 B1 * | 7/2003 | Ochoa | 296/203.03 |
| 6,644,888 B2 * | 11/2003 | Ochoa | 404/6 |
| 6,702,911 B2 * | 3/2004 | Toi et al. | 156/93 |
| 6,766,984 B1 * | 7/2004 | Ochoa | 244/119 |
| 6,830,407 B1 * | 12/2004 | Ochoa | 404/6 |
| 6,974,633 B2 * | 12/2005 | Garratt et al. | 428/598 |
| 7,074,474 B2 * | 7/2006 | Toi et al. | 428/102 |
| 7,195,309 B1 * | 3/2007 | Subramanian et al. | 296/198 |
| 2006/0060705 A1 * | 3/2006 | Stulc et al. | 244/119 |
| 2006/0208135 A1 * | 9/2006 | Liguore et al. | 244/117 R |
| 2006/0213142 A1 * | 9/2006 | Albracht | 52/543 |
| 2007/0000197 A1 * | 1/2007 | Patrick et al. | 52/335 |
| 2008/0006002 A1 * | 1/2008 | Strickland et al. | 52/737.6 |
| 2008/0023988 A1 * | 1/2008 | Ochoa | 296/191 |

* cited by examiner

STIFFENERS FOR UTILITY TRAILER STRUCTURAL PANELS

RELATED CASE

The present application claims priority from U.S. Ser. No. 60/833,382 filed Jul. 26, 2006.

FIELD OF THE INVENTION

This invention relates generally to a reinforcing support structure for utility trailer structural panels of the skin-stiffener type, and more particularly to stiffeners mounted on utility trailer panels.

BACKGROUND OF THE INVENTION

Stiffeners such as roof bows have long been used in the transportation industry as basic structural elements that serve to reinforce the sides and roof of vehicle cargo areas. These structures are commonly installed adjacent to wall members as local reinforcements. Roof bow sections are often formed from high yield strength steel in an effort to increase strength and buckling resistance of the cross sections under various types of loads, including vibration, weather-related (such as snow and ice), and contact loads associated at times with fork lifts and other equipment, as well as the cargo itself, which may impinge upon the section. The strength of the roof bow cross section combined with its ability to interface structurally (often through an adhesive bond layer) with the skin that it reinforces are key to the structural performance of the combined structure.

Stiffeners such as roof bows are important structural members for reinforcing the roof and walls of utility trailers. These members are commonly cold formed by rolling operations to form reinforced utility trailer structures. Such structures permit the designer to achieve maximum strength and stiffness at a minimum weight, while also generally meeting other important installation and in-service requirements. Little has changed during recent decades in regard to the fundamental materials or shapes that are available, other than the introduction of improvements in the metallurgy and surface finish that has made roof bows stronger and more corrosion resistant. Because of ever increasing fuel economy demands and the general need for more economical transport of goods, there is a significant need for improvements that enable roof bows to be lighter, stronger, and more damage resistant than existing designs, while interfacing effectively with adjacent structural elements.

Over the past several years, utility trailer design engineers have been challenged to address ever-higher payload requirements. This has occurred in parallel with weight reduction and other structural efficiency goals that have driven the industry. Ever present safety and structural integrity demands have led the industry to look for more efficient and effective structural members and configurations that are more robust while addressing weight concerns.

Generally speaking, a stiffened utility trailer panel's load-carrying capability is directly related to the type and strength of the stiffener typically installed on one side of the panel. The current approach within the industry to meet higher competitive demands has ranged from resorting to sophisticated alloys, including extruded aluminum and other alloys. It has also included approaches such as using specialty fiber reinforced composite structures, and increasing the depth of conventional stiffener designs as well as the yield strength of the material used in making the stiffeners.

The first, and most common, approach taken by the industry in addressing the higher requirements has been to make conventional stiffeners out of heavier or higher strength materials. These traditional stiffener designs include the C-channel stiffener and Z-shaped stiffener, as well as the hat-shaped stiffener. Heavier gauges such as 0.055 inch min. (17 gauge) to 0.070 inch min. (15 gauge) material are now common. The use of thicker material has not only lead to greater tooling and handling costs, but also has had the effect of simultaneously creating other major problems.

The utility trailer structural panel including any attached stiffeners is a system of parts interacting with each other as they are acted upon by combinations of pressures and in-plane as well as bending loads. Currently, stiffened-panel utility trailer structures found in the floors, side walls, and roofs of utility trailers are typically constructed using steel, aluminum or fiber reinforced composite skins with steel, aluminum, or fiber reinforced composite stiffeners.

In general, metal stiffeners seem to provide greater support as the stiffened panel system sustains bending moments as well as in-plane and pressure forces during service. However, an incompatibility occurs when relatively thick, stiffer sections, i.e., stiffeners made of 0.055 inch min. to 0.070 inch min. material are joined or fastened to thinner, less stiff skin made of 0.027 inch min. to 0.050 inch min. material. The interface area where these two sections are joined is an area of load transfer and thus of relatively higher stress. The reason for this is that the stiffer section resists conforming to the deformation of the less stiff sections as loads are increased. The result is that one part of the system, the skin, tries to slide relative to another part of the system, the stiffener. This may result in early failure of the system, such as by buckling of the stiffener or of the skin. This is due to in-plane loads that result from the constraint that the stiffener imposes on the adjacent skin as the loads are increased. Because of the increased stress at the interface or joining area, manufacturers have been forced to modify parts of the stiffened panel to offset this effect. Because the use of heavier stiffeners increases the shear load through the interface that commonly includes an adhesive layer or fasteners, heavier panels and mounting members have been introduced. One approach to alleviate the problem has been to use stronger adhesive bonds with additional fasteners. This has been implemented in an attempt to alleviate the effects of the high local in-plane compressive stresses that the heavy stiffeners may impose on the panel skin. However, this approach is undesirable because by increasing the number of parts, and increases the complexity and cost of the system.

This approach requires still heavier stiffeners, since the stiffener failure risk is somewhat reduced when it acts as an independent component rather than as part of a fully integrated system. Another drawback to additional fasteners is that it requires substantially more tooling and installation time.

Another approach generally taken by the industry is to make the current generally radial sections including hat-shaped and C-channel stiffeners, deeper and out of thinner, yet higher yield strength material. This offers the advantage of reducing in-plane stress while at the same time increasing bending stiffness due to the deeper configuration. However, this approach has major disadvantages.

First, the thinner materials used in these traditional stiffener configurations make these stiffener sections more susceptible to edge stress concentrations. The conventional C-channel, Z-shaped, and hat-shaped stiffeners have a "blade edge." This edge is very susceptible to imperfections in the sheet material along this edge as well as to damage during manufacture, shipping/handling and installation. These imperfections along the blade edge become stress concentration points or focal points at which failure of the stiffener and adjacent fasteners or adhesive layers can initiate. Even the most perfect, smooth edge of the conventional stiffener will experience a very localized point of high stress gradient due to the characteristic edge stress concentration associated with open sections under bending loads.

Thus, initiation of an edge "bulge" or "crimp" on a perfect smooth edge is nothing more than the creation of an edge imperfection that is large enough to grow or "propagate" easily. It is significant that this stress concentration may be made worse by the presence of any relatively small local edge imperfections, even those on the order of size of the thickness of the stiffener material itself.

These imperfections near the edge can be in the form of edge notches, waviness (in-plane or out-of-plane), local thickness variations, local residual stress variations, or variations in material yield strength. Where multiple imperfections occur together, they may all compound together to further increase the stress concentration effect, and thus lower the load level at which failure is initiated. Thus, the existence of any edge imperfections in a conventional stiffener has the effect of enhancing an already established process of failure initiation.

Second, all the above conventional stiffeners, when manufactured out of relatively thin sheet materials, are more susceptible to buckling due to the reduced thickness. Buckling is an instability in a part of the stiffener associated with local compressive or shear stresses. Buckling can precipitate section failure of the stiffener. This in turn causes a stress concentration in the adjacent adhesive bond line or fasteners of the panel skin near the buckled stiffener section, which may cause the stiffened panel system to fail.

Finally, some thinner conventional stiffeners can experience "rolling" when placed under load. Rolling may be caused when the shear stresses within the stiffener result in a net torque about the centroid of the thin walled cross-section thus causing the cross-section to twist, possibly making the stiffener unstable. Another cause of rolling is the curvature of the panel itself that is induced by in-plane or pressure loads that are imposed upon the stiffened panel. Some utility trailer builders have increased the cross-sectional length of the flange furthest from the panel skin of the conventional C-channel stiffener in their attempts to solve the rolling problem, but have been met with only marginal improvement. This is because the increased flange length has had the simultaneous effect of increasing the distance from the centroid to the shear center of the channel. Additionally, increasing the cross-sectional flange length caused difficulty in accessing the fastener areas used in mounting the C-channel to the stiffened panel.

SUMMARY OF THE INVENTION

The present invention alleviates and overcomes the above-mentioned problems and shortcomings of the state of the art through a novel utility trailer structural panel stiffener. This structural panel stiffener: 1) may be made of thinner material to reduce the in-plane stresses found in the joining area, 2) resists loads adequately to meet new requirements, 3) is resistant to buckling and rolling, 4) effectively addresses edge stress concentrations by modifying the blade edge to an area of relatively low stress, and 5) may be manufactured cost effectively using conventional manufacturing methods.

In one embodiment, the utility trailer structural panel comprises a sheet skin portion, and an elongate stiffener secured to the sheet skin portion. The stiffener defines in cross section a central flange spaced from the sheet skin portion, a web extending from the central flange toward the sheet skin portion, and a mounting flange extending laterally from a respective web. Each of the mounting flanges has a free edge, and a tubular bead extends along the free edge of each mounting flange for reinforcement. Each tubular bead has an elliptical cross section with a minor axis that is at least 20% of the major axis.

In another embodiment, the utility trailer panel skin has a generally planar configuration with an outer surface and an inner surface. A plurality of generally parallel elongate stiffeners are aligned to each be substantially transverse to a longitudinal axis of the utility trailer.

In another embodiment, the tubular bead of each elongate stiffener has a closed end to define an enclosed area, and a curled end portion of the bead extends within the enclosed area to provide reinforcement.

It is a feature of the invention to provide stiffeners for utility trailer panels of a minimum weight while maintaining strength requirements.

These and further features and advantages of the present invention will become apparent from the following detailed description, wherein reference is made to the figures in the accompanying drawings.

DETAILED DESCRIPTION OF PREFERRED EMBODIMENTS

The structural panel stiffener may be a substantially reconfigured or stabilized stiffener having stabilizing mounting flanges. It should be noted that due to their extreme susceptibility to rolling, very thin conventional stiffeners are seldom used in utility trailer structural panels. The unexpectedly strong synergisms of the unique characteristics found in the stabilized stiffener not only address the above problems, but simultaneously obtain significant material savings. More particularly, the synergisms may be described as follows.

The instant stiffener has substantially redistributed material to critical locations compared with conventional stiffener configurations. This material redistribution has the effect of altering considerably the behavior of the stiffener as compared with conventional hat-shaped stiffeners and other stiffener configurations.

The material redistribution to accomplish these collaborative effects is accomplished by having specifically placed free edge portions, which are turned inwardly to define tubular beads or curls along the free edges. Moreover it is not just the presence of the tubular bead or curl that enables the substantial level of synergism, but the discovery of specific ratios of curl diameter to other stiffener dimensions that maximize these synergisms even to the extent of obtaining significant weight savings.

Two sets of synergisms combine to make the present stiffener successful. The first set of synergisms is directly related to the ratio of the diameter of the curl to the stiffener section flange length and web length. Each tubular bead has a cross-sectional dimension which, when combined in specific ratios with other stiffener dimensions, substantially maximizes the moment of inertia of the overall section about the horizontal and vertical axes with a minimal use of material. Moreover, the tubular bead size specified by these same ratios has the effect of altering the characteristic failure mode normally associated with the free edge stress concentration for conventional stiffeners, as discussed above. Finally, the cross-sectional dimension of the tubular beads of the stabilized stiffener make the stiffener less sensitive to edge imperfections and damage because the blade edge is placed in a position of relatively benign stress levels, so that imperfections or damage to the tube or edge region have to be on the order of size of the diameter of the curl in order to have significant detrimental effect to the stiffener section.

Having established the above ratios, a second set of synergisms by directly combines the above with specific ratios of the stiffener's cross-sectional web dimension to cross-sectional flange dimension. The compounding effect of the first set of synergisms with this additional set of ratios makes the stabilized hat-shaped stiffener more resistant to rolling and buckling and thus avoids the problems that plague deeper conventional structural panel stiffeners using thinner gauge material. Additionally, these compounding synergisms make this stiffener unique in that stresses are now more evenly distributed in the flanges, thus making the stiffener more stable and less sensitive to dimensional imperfections. Because of these cooperative effects, the stabilized stiffener demonstrates its uniqueness and efficiency in using thinner gauge material to reduce in-plane stresses found in the joining area, thus allowing the panel and stiffener to work together as a more cohesive system instead of as individual components.

Because the stabilized stiffener effectively addresses the problem of in-plane stresses in the area nearest the panel skin, the use of fewer fasteners may be considered. The utility trailer builder may now uniquely rely upon a single stiffener design to address the stiffening of a wide variety of structural roof panel and side panel constructions.

When compared to conventional stiffeners, the stabilized stiffener uses substantially thinner material while obtaining better resistance to service loads. For each of the embodiments disclosed herein, the web is fixedly secured to and extends from the central flange, and each tubular bead is fixedly secured to and extends from a free edge of the mounting flanges. More particularly, the stiffener's central flange, web, mounting flanges, and tubular bead are all formed from a single sheet of metal having a uniform thickness. Thus, even though additional slit width (width of the sheet of material from which the stiffener is made) is required to reposition needed material, the use of thinner gauge material more than offsets the additional slit width, bringing overall material savings as high as 15% in some instances. This innovation in system configuration represents an additional cost savings for the utility trailer builder, since material cost is a significant portion of total manufacturing cost of stiffened panel structures.

For manufacturing process cost efficiency, the tubular bead is preferably an open-section bead, meaning for example that the sheet material may be formed in an almost complete bend or curl, but the curl need not be closed near its outer edge, such as by welding, bonding, or joining. A closed section tubular bead would work equally well, at a slightly higher fabrication cost.

This edge feature is discussed in more detail as follows. The mounting flange curls are preferably open-sections that are made by shaping the free edges or edge marginal portions of the stiffener cross-sections into an elliptical, preferably circular, cross-sectional shape. As used herein, a circular cross-section is considered to be a special case of an elliptical cross-section. The term "characteristic diameter" refers to a constant diameter in the case of a circle, while other elliptical shapes will have major and minor axes or diameters, with the minor axis or diameter being the "characteristic diameter."

Even though some configurations of a slightly non-circular elliptical shape may be more desirable in some applications, the circular cross-section is generally preferable, because it is simpler to manufacture, while still achieving the desired benefits to a significant degree.

It is important to contrast the edge curl approach against other possible edge treatment approaches by noting that the dimensional order of size effect related to imperfections or damages described above for the curl cannot be achieved by simply folding the edge over, either once or multiple times, because in this case the characteristic dimension with respect to the local stresses will be defined by the fold edge diameter and not by the length of overlap of the fold. This is because the overlap direction is transverse to the edge and quickly moves out of the peak stress region, and because the edge fold diameter defines the maximum distance over which the edge stresses may be effectively spread.

The elliptical or circular open-section tubular shape or "edge curl" is contrasted to tubular sections of rectangular cross-sectional shapes, including folded edges, and to open-section tubular shapes of softened corner polygon cross-sectional shapes. The characteristic diameter with respect to the local stresses will be defined in each of these other cases by the fold diameter or by the softened corner diameter nearest to the stiffener edge, as opposed to the overall diameter of the edge curl section.

It may be noted that in this context a rectangular or polygonal cross-section with very softened corners or curved sides is in effect an imperfect ellipse or circle.

In some instances, quasi-elliptical or quasi-circular cross-sections, imperfect ellipses, and imperfect circles in the form of polygon cross-sections with very softened corners may function adequately, but may also be more difficult to fabricate and will be less effective than a generally circular curl. In other cases, the tubular edge may be formed by lapping the edge over itself one or many times in order to achieve specific design objectives.

Other variations are obtained by including local offsets or adding material locally, such as by bonding or welding strips of material or high strength fibers or wires. Still other variations include local modifications to the material, such as by heat, electromagnetic, chemical, or deformation treatment of the tubular bead cross-section or of adjacent regions. In spite of the potential for additional fabrication costs, some of the above variations may at times be desirable, for example where the designer desires local regions of modified cross-sectional shape for space claim, interfacing, or joining reasons. In some applications, the curl may be formed by turning the edges through an arc of up to 360 degrees, 720 degrees, or even more, so that the edge loops over one or more times on itself, in order to concentrate mass locally or to address other design objectives. In these cases, manufacturing economy and complexity are also considerations.

The resulting synergistic effect of the stabilized hat-shaped stiffener's material efficiency in obtaining the desired bending rigidity or moment of inertia, the alteration of the characteristic failure mode, the reduction in sensitivity to edge imperfections and damage, resistance to buckling and rolling as well as the ability to spread stresses more uniformly has the same degree of compounding advantage as the conventional stiffener's compounding disadvantage of low resistance to buckling and rolling combined with sensitivity to relatively small edge or dimensional imperfections.

Accordingly, it can now be appreciated by those versed in this art that the novel stabilized hat-shaped stiffener of this invention provides a solution to the problems that the utility trailer stiffened panel art has sought to overcome. Areas of viable application include stiffened panel applications in side wall, floor, or roof areas. In these applications, the stiffeners are usually installed such that they project in a direction substantially perpendicular to the surface of the panel skin with which they are associated.

In summary, the stabilized stiffeners of the present invention having stabilizing mounting flanges are designed to be compatible with substantially all standard stiffened panel utility trailer body configurations, thereby significantly reducing the number of stiffeners and panel stiffener members that utility trailer assemblers must carry in their inventories and employ, to permit more stringent design criteria to be met, and to permit this to be done without major modification of other associated hardware.

The following description of the invention may incorporate dimensions that are representative of the dimensions that will be appropriate for most commonly found stiffened panels. Recitation of these dimensions is not intended to be limiting, except to the extent that the dimensions reflect relative ratios between the sizes of various elements, as explained where appropriate.

Figure 1:
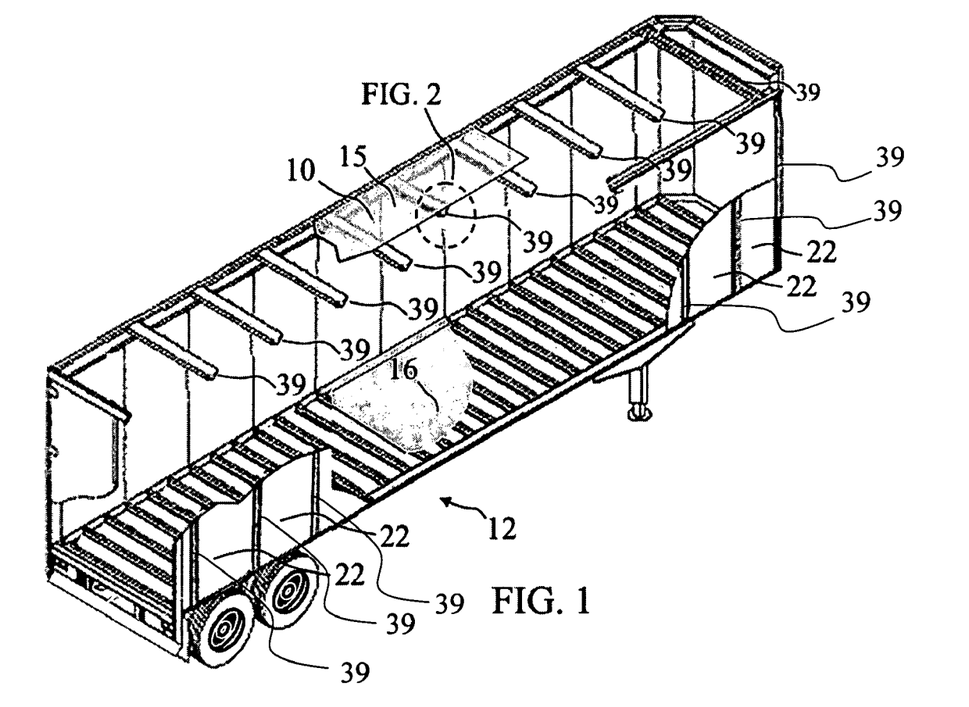
FIG. 1 is a perspective of the inner side of a stiffened utility trailer panel with stabilized hat-shaped stiffener members, with portions cut away.
Figure 2:
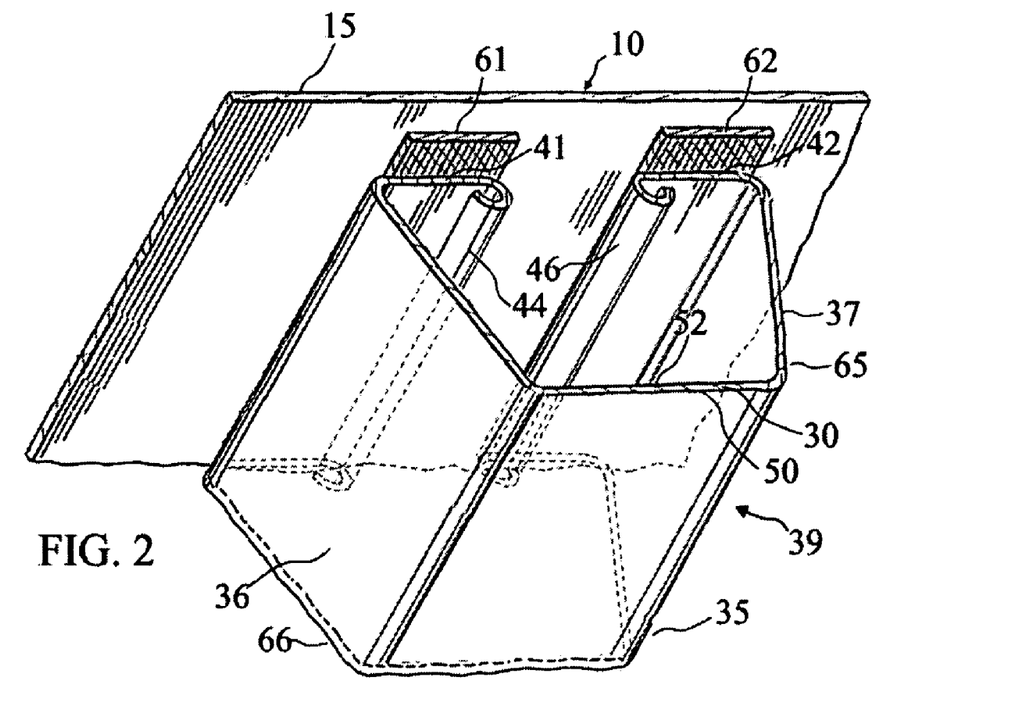
FIG. 2 is a perspective of a portion of a stiffened utility trailer panel shown in FIG. 1 showing a vertically extending stiffener secured to the stiffened panel section.
Figure 3:
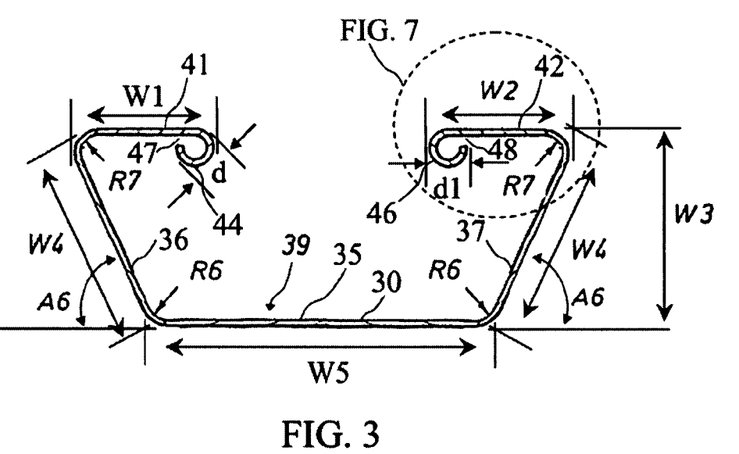
FIG. 3 is an enlarged sectional view of beads on free ends of the stiffener.

Referring now to the drawings for a better understanding of this invention, and more particularly to a preferred embodiment shown in FIGS. 1-3, a stiffened structural panel is shown generally at 10 including an outer skin 15 for installation onto or as an integral part of a utility trailer structure, where the trailer body is reinforced by stiffeners, sometimes referred to as "roof bows" in the utility trailer industry.

Skin 15 in this preferred embodiment may be contoured, sheet metal aluminum utility trailer panels. The skin 15 may be curved or contoured, e.g., so that the top skin the trailer is slightly dome-sloped, in which case the stiffener 39 may also be curved or contoured along their axial length in a similar manner, thereby making the trailer skin stronger and more stable. In other embodiments, the skin may be made of alternate materials, such as fiber reinforced materials. When roof bows or stiffeners 39 are not attached directly to the skin 15 using fasteners such as rivets, they may be attached using adhesive bonds 61 and 62, that are positioned between mounting flanges 41 and 42 and skin 15, where they comprise a layer of material that transfers load between the mounting flanges of the stiffener or roof bow and the skin 15. Each of the flanges may extend laterally inward, or in other embodiments laterally outward, from an outer side of the web. Roof bow or stiffener members 39 typically have a web with curved contour that is roughly the same as the desired contour of the utility trailer body. This contour may be obtained during the process of roll forming stabilized stiffener 39 to the desired shape, during a subsequent stretch forming process, or both. During these operations, the tubular beads help the stresses to be more evenly distributed, thus giving more uniform deformation over the section of the stiffener.

It is highly preferred that the adhesive bonds 61 and 62 be of uniform thickness in order to maximize the strength and durability of the adhesive bond. Thus, accuracy and consistency of the mating interfaces between skin 15 and the mounting flanges 41 and 42 of the stiffener insure that the utility trailer body will be assembled with no pre-stressed parts and no cosmetic imperfections.

The present invention improves the dimensional stability of stiffeners 39 by significantly stabilizing the cross-section during forming operations, as well as during subsequent handling and installation. In addition, the improved damage resistance of these structural components stabilizes and strengthens the members during such operations as clamping and drilling, as the members are mounted in fixtures (when required) and assembled.

Figure 4:
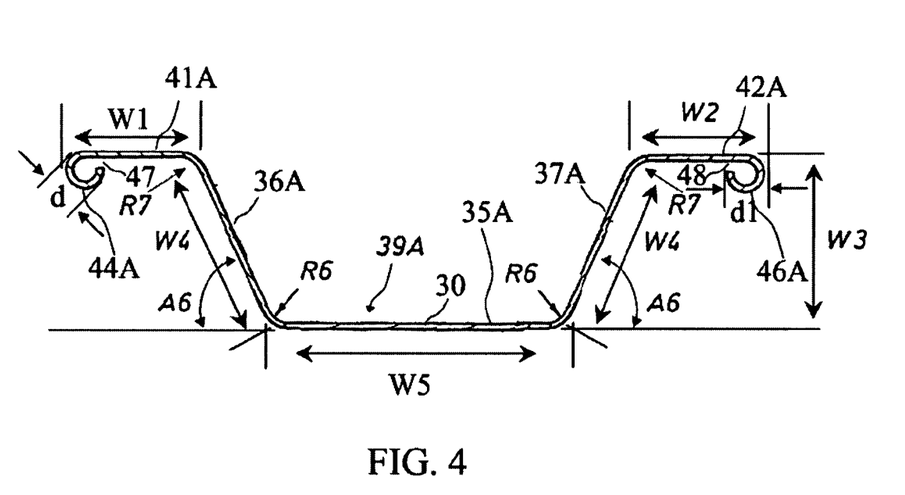
FIG. 4 is an enlarged section of a modified stiffener in which the mounting flange extends in an opposite direction from the mounting flange for the embodiment of FIGS. 1-3.

Stiffener 39 is generally of a radial body configuration in cross section, comprising a central horizontal flange 30 with substantially vertical webs extending from each extreme of the central horizontal flange 30, each web 36 and 37 having a respective mounting flange 41, 42 at its outer extreme, each mounting flange 41, 42 having a respective tubular bead 44, 46 near its free edge. As shown in the drawings, stiffener 39 may be commonly formed of a sheet material such as steel alloy, or a fiber reinforced material. It comprises in the panel shown in FIG. 2 a body 35 and stabilizing mounting flanges 41 and 42 generally parallel to body 35. Webs 36 and 37 are each spaced between body 35 and a respective flange 41, 42. Although not shown, the webs 36, 37 could be perpendicular to 41, 42 and 35, but commonly are inclined, as shown. Each web 36, 37 nevertheless has a component which is perpendicular to the flanges 41, 42 and to the body 35. The opposed free edge portions of stabilizing mounting flanges 41 and 42 are turned inwardly to form open-section tubular beads or edge curls 44 and 46, respectively. Respective open gaps 47 and 48 are formed adjacent each tubular bead 44, 46. Tubular beads 44, 46 are shown as being of circular configurations or shapes in cross section and have outer diameters indicated at d and d1. Tubular beads 44, 46 are turned inwardly an angular amount A of about 270 degrees from the flange 41 and flange 42, as shown in FIGS. 3 and 4 particularly.

Thus, gaps 47 and 48 are each of an angular amount about 90 degrees. If desired, tubular beads 44, 46 could be closed, although about 270 degrees has been found to be optimum. An angular or circular shape for beads 44, 46 as small as about 210 degrees would function in a satisfactory manner in most instances.

While a circular shape for tubular beads 44 and 46 is preferred, a non-circular elliptical shape would function adequately in most instances. A tubular bead or curl of an elliptical shape has a major axis and a minor axis. Diameter or dimension d or d1 for an elliptical shape is interpreted herein for all purposes as the average dimension between the major axis and the minor axis. The major and minor axes are at right angles to each other and are defined as the major and minor dimensions of the open or closed tubular section. To provide an effective elliptical shape for tubular beads 44 and 46, the length of the minor axis should be at least about 20 percent of the length of the major axis. The terms "elliptical" shape and "elliptical" cross section are to be interpreted herein for all purposes as being generic to and including circular shapes and circular cross sections. Preferably, diameter d1 for bead 46 is similar to diameter d for bead 44 in a non-circular elliptical shape. As shown in FIG. 3, integral outwardly sloping wall portions 36 and 37 extend from flat or gently curved flange 30 having arcuate apex 52.

In order to obtain the desired minimal weight stiffener, tubular curls or beads 44, 46 must be shaped and formed within precise ranges and sizes in order to provide maximum strength. It is preferred that diameter d1 for curl 46 be similar to diameter d for curl 44. W1 and W2, which are the respective width of the mounting flanges 41, 42, are between about 2 and 8 times the outer diameter of tubular curls 44 and 46 for satisfactory results. A ratio of about 3 to 1 between W2 and d1 or W1 and d has been found to provide optimum results. Width W5, which is the width of the central flange or body 35 spaced from the skin 15, is between about 1 and 4 times widths W1 and W2 for best results. By providing such a relationship between tubular curls 44, 46 and widths W1 and W2 the moment of inertia is maximized and edge stress concentrations are minimized for stiffener 39 thereby permitting the light weight construction for stiffener 39 of the present invention. Using various design formulae to determine the outer diameters of tubular curls 44 and 46, an example of a suitable stiffener 39 includes the following dimensions. W1 and W2 are each 0.5 inch, W4 is 1.3 inch, and W5 is 1.3 inch. The diameter d for bead 44 is $7/32$ inch and diameter d1 for bead 46 is $7/32$ inch.

Tubular curls 44, 46 are illustrated as turned inwardly which is desirable for many applications. In some instances, however, it may be desirable to have a tubular curl turned outwardly. While stiffener 39 has been shown as mounted adjacent but not in contact with the inside surface of skin 15 stiffener 39 may, if desired, be mounted directly on the skin. Stiffener 39 may also be mounted on each panel 10, or only on selected panels 10 as desired.

FIG. 4 shows another embodiment of a stiffener in which stiffener 39A has mounting flanges 41A, 42A extending outwardly from body 35A. Tubular curls or beads 44A and 46A together with the dimensions shown at W1, W2, W4, W5, d, and d1 are similar to the embodiment of FIGS. 1-3. The only change in the embodiment of FIG. 4 from the embodiment of FIGS. 1-3 is the direction in which mounting flanges 41A and 42A extend.

Figures 5, 5A:
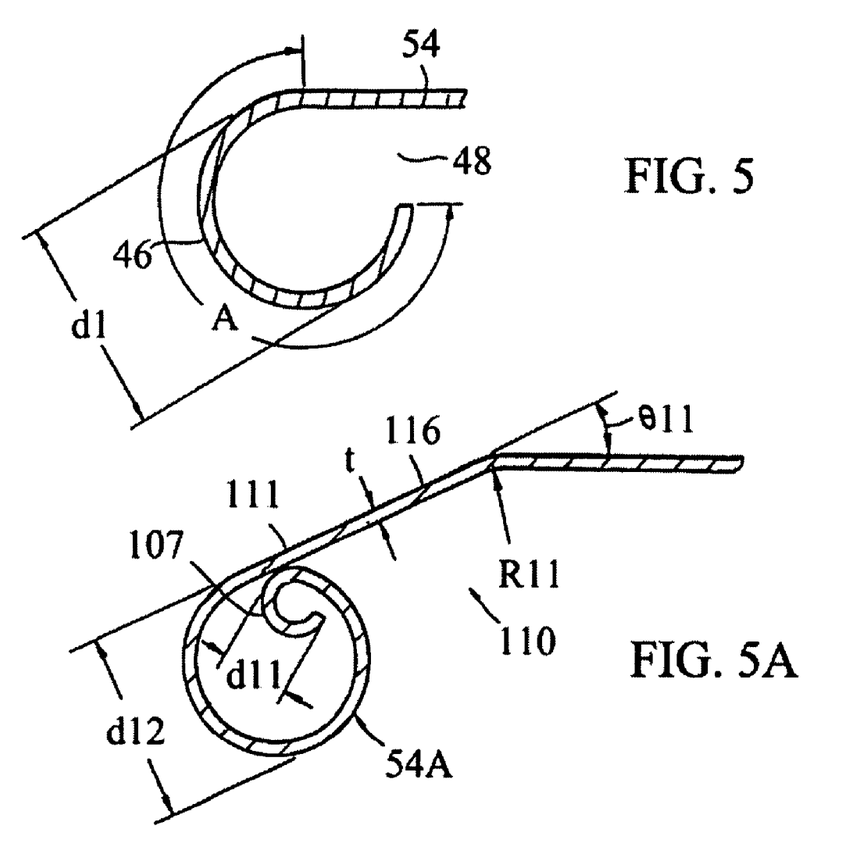
FIG. 5 is an enlarged sectional view of a bead on a free end of the stiffener.
FIGS. 5A and 5B are enlarged sectional views of modified beads on a free end of a stiffener.
Figure 5B:
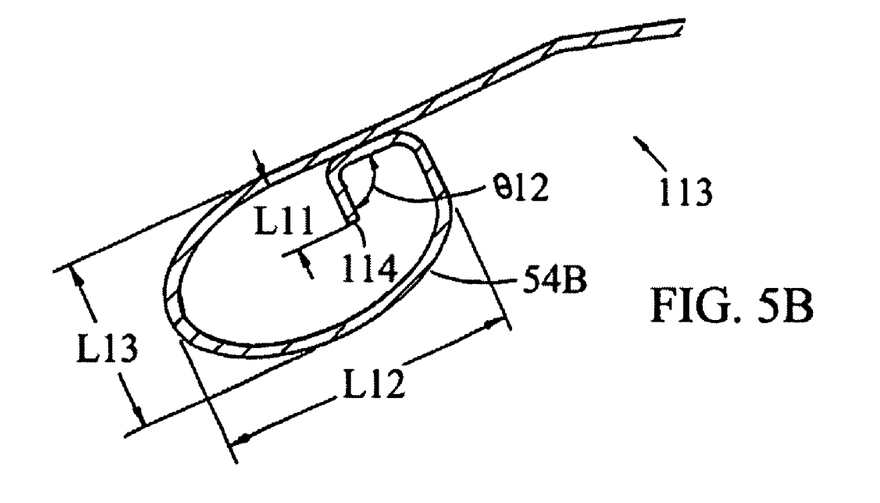

FIGS. 5A and 5B show two embodiments of alternative tubular edge features to that of FIG. 5. Each of these two embodiments is directed to a bead or curl in which the outer diameter to thickness ratio of the tubular edge is larger than about 13. In these cases, additional stiffening of the tubular edge may be desired. As shown in embodiment 110, a smaller elliptical curl 107 inside the tubular edge feature 54A is shown in FIG. 5A, and includes a "curl flange" 116 with associated thickness t, radius R11, and angle theta 11 in order to further stabilize tubular edge 54A. For ratios of radius R11 to thickness of 3.5 or less, and for angles theta 11 between 30 and 120 degrees in the positive or negative direction, a special strengthening effect is obtained which causes the curl flange 116 to act together with tubular edge 54A so that the entire edge is substantially strengthened and stabilized against warping. This added stabilization is thus a very useful extension of the capabilities of the present invention.

As an alternative to the curl within a curl of FIG. 5A, FIG. 5B shows embodiment 113 having a lip 114 of length L11 that may be applied to the free edge of the curl 54B, such as is shown in FIG. 5B. In this case the angle theta 12 is between 30 and 120 degrees for best results, and the length L11 of lip 114 is between 1/5 and 4/5 of the average of edge tube dimensions L12 and L13 for best results. Longer lips may be used, but usually with limited additional benefits over the benefits of the range given.

A typical utility trailer panel may be of dimensions being 102 inches by 48 inches. The stiffeners are preferably secured to the panel, each being made of steel and having a thickness of 0.036 inch with W1 and W2 being 0.6 inch and W3 being 1.2 inches. Diameter d is $7/32$ inch and diameter d1 is $7/32$ inch.

Figure 6:
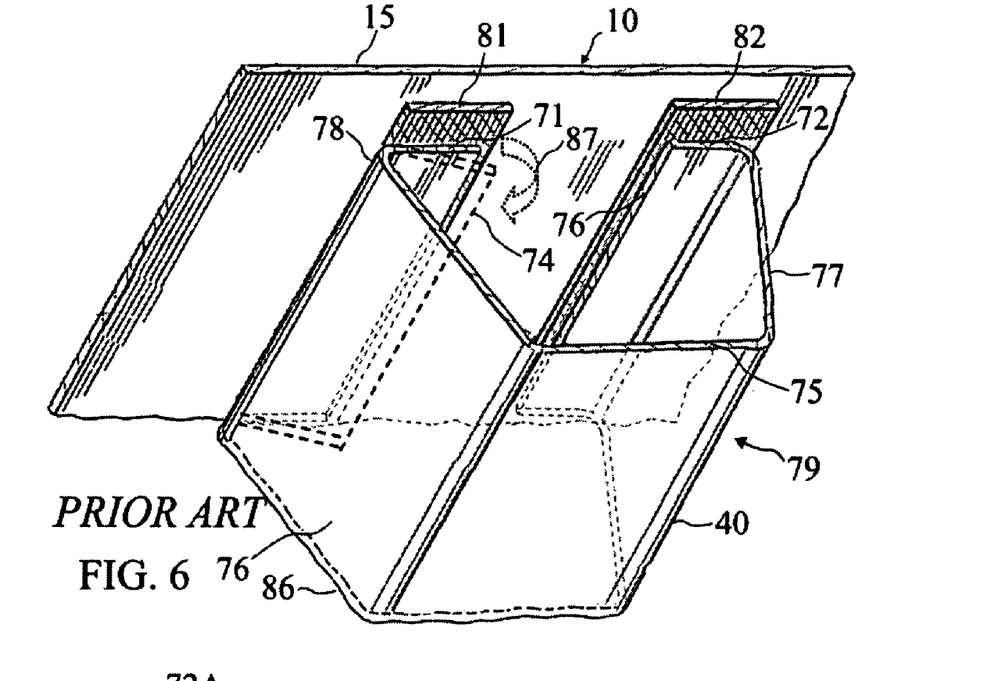
FIG. 6 is a perspective of a portion of the stiffened utility trailer panel shown in FIG. 1 showing a vertically extending conventional stiffener of the prior art having blade edges on free ends, secured to the stiffened panel section, with FIG. 6A showing an enlarged sectional view of blade edge deformation near a free end of the stiffener of FIG. 6.
Figure 6A:
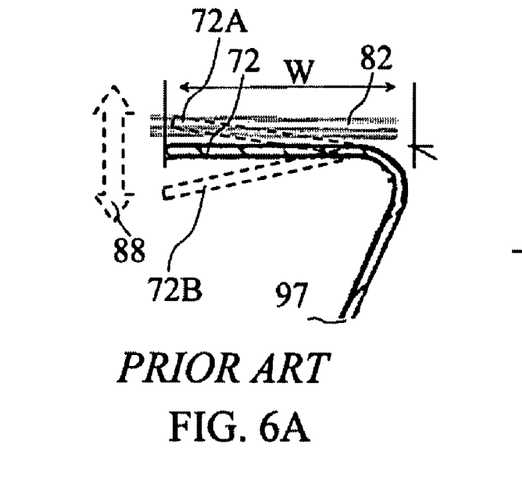
Figure 7:
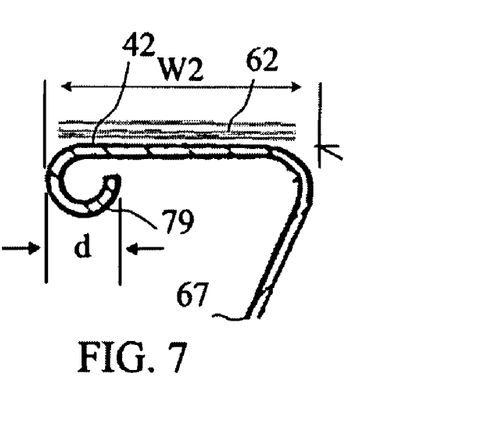
FIG. 7 is a perspective of a portion of the stiffened utility trailer panel shown in FIG. 1 showing a modified vertically extending stiffener secured to the stiffened panel section.

Referring now to the perspective view of FIG. 6, a stiffener section of the prior art is shown having blade edges along the ends of the section. The relative lack of stiffness of the mounting flange blade edges is illustrated in FIG. 6A where flange 72 is shown to be able to rotate and translate as indicated by arrows 87 and 88 to positions 72A or 72B. The lack of a stabilized mounting interface combined with the presence of sharp edges has the detrimental effect of enabling the blade edge to physically cut or damage adhesive bond layer 82 which may fail as a result of the damage. The relative lack of mounting flange stiffness of FIG. 6A is contrasted with the much more stable mounting flange of the present invention shown in FIG. 7, where the curled edges also serve to eliminate the sharp cutting edge to make the mounting flange more resistant to cutting the associated adhesive bond layer 62. The synergistically improved mounting flange is as much as thirty times more resistant to rotation, movement, local deformation, and buckling instability, as compared with the mounting flange of the prior art shown in FIG. 6A. It is quite novel to provide a stable region of relatively uniform thickness (especially under load) that enhances the strength capabilities of adhesives that are designed to perform best at a prescribed bond thickness. This novel and synergistic structural system significantly enhances the effectiveness of the adhesive bond, thereby enabling the use of stronger adhesives that might be more brittle, and thus more susceptible to damage due to blade edges of the prior art. This comparison highlights specific synergistic improvements that are made possible by the present invention-improvements that enable the successful use of thinner materials in these types of utility trailer stiffened structures.

Figure 8:
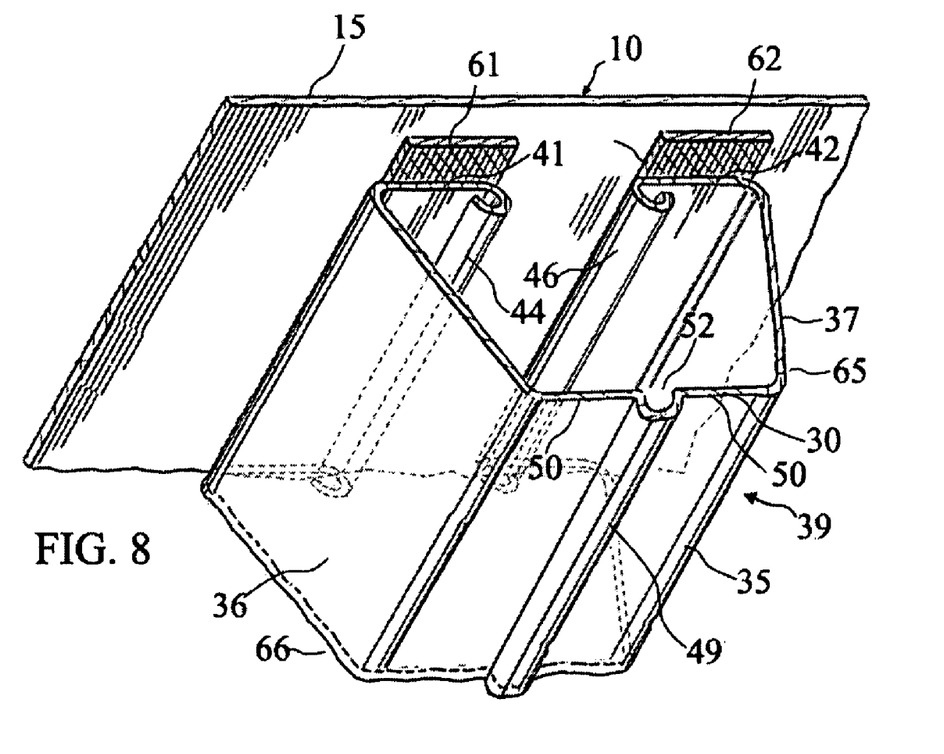
FIG. 8 is a perspective of a portion of a stiffened utility trailer panel shown in FIG. 1 showing a vertically extending stiffener secured to the stiffened panel section, with the stiffener incorporating a stiffening rib.

Referring now to FIG. 8, stiffener 39 is shown in perspective view, having the same geometry as in FIG. 2, with the exception that rib 49 is shown as a synergistic web design feature that enables still thinner material to be used, while increasing the buckling resistance of flange 30, according to the various design ratios discussed. Stiffener ribs 39 may be bonded together, e.g., an elongate vertical rib may be welded at one end to the elongate horizontal rib adjacent a corner of the trailer shown in FIG. 1, thereby reinforcing the stiffening rib design.

As a result of providing the turned tubular beads or curls along the marginal edge portions of the stiffener, an unexpected significantly thinner gauge material generally about fifteen percent lighter has been utilized for the stiffener as compared with prior art panel stiffeners as utilized heretofore. By utilizing precise tubular beads as set forth herein on the selected members where it is most needed for stiffener strength and to provide a stabilized mounting interface, a utility trailer builder may utilize an unexpected substantially thinner gauge material while eliminating or minimizing problems encountered heretofore by prior art designs of stiffeners for utility trailer panels, such as those used in roofs and side walls.

While the particular invention as herein shown and disclosed in detail is fully capable of obtaining the objects and providing the advantages hereinbefore stated, it is understood that this disclosure is merely illustrative of the presently preferred embodiments of the invention and that no limitations are intended other than as described in the appended claims.

What is claimed is:

1. A utility trailer structural panel, comprising:
    a utility trailer panel skin having a generally planar configuration and defining an inner surface and an outer surface;
    a plurality of generally parallel elongate stiffeners each having a central flange spaced from said sheet skin portion and a web fixedly secured to the central flange and extending from each outer side of the central flange toward the sheet skin portion;
    each of said elongate stiffeners aligned to be substantially transverse to a longitudinal axis of said utility trailer;
    a mounting flange fixedly secured to and extending laterally from said web, each of the mounting flanges having a free edge; and
    a tubular bead fixedly secured to and extending along a portion of the free edge of each mounting flange for reinforcing said stiffeners, wherein the tubular beads are each of an elliptical cross section with a minor axis that is at least about 20 percent of the major axis.

2. A utility trailer structural panel as defined in claim 1, further comprising:
    each web, a corresponding central flange, a corresponding mounting flange, and each corresponding tubular bead being formed from a single sheet metal material.

3. A utility trailer structural panel as defined in claim 1, further comprising:
    an adhesive bond extending between and secured to said utility trailer panel skin and a respective stiffener.

4. A utility trailer structural panel as defined in claim 3, wherein said adhesive bond is made from a polymeric base material.

5. A utility trailer structural panel as defined in claim 4, wherein said adhesive bond is of a uniform thickness.

6. A utility trailer structural panel as defined in claim 1, wherein at least one mounting flange of each stiffener is planar and is angled with respect to a corresponding web.

7. A utility trailer structural panel as defined in claim 1, wherein each tubular bead has a circular cross-section and extends in a circular path of at least about 210 degrees.

* * * * *